Figure 1:
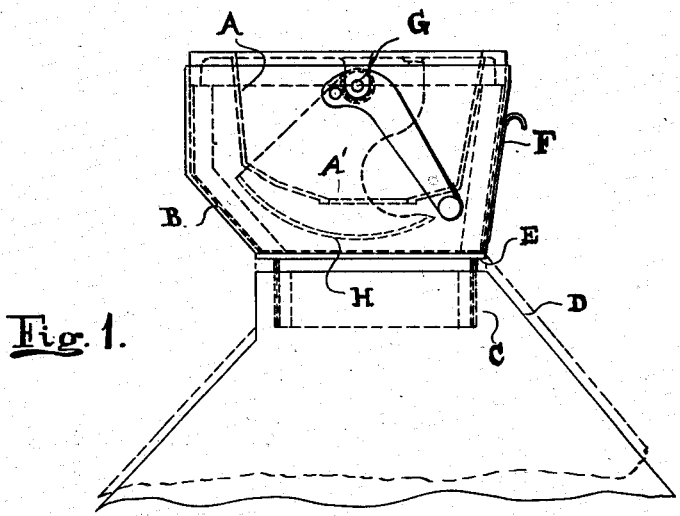

S. H. JOHNSON.
AUTOMATIC WEIGHING APPARATUS.
APPLICATION FILED NOV. 13, 1913.

1,135,379.

Patented Apr. 13, 1915.

Witnesses:

Inventor
Sidney H. Johnson
by Finckel & Finckel
Attorneys.

UNITED STATES PATENT OFFICE.

SIDNEY H. JOHNSON, OF SOHO FOUNDRY, NEAR BIRMINGHAM, ENGLAND, ASSIGNOR TO THE AVERY SCALE COMPANY, OF NORTH MILWAUKEE, WISCONSIN.

AUTOMATIC WEIGHING APPARATUS.

1,135,379.      Specification of Letters Patent.      Patented Apr. 13, 1915.

Application filed November 13, 1913. Serial No. 800,799.

*To all whom it may concern:*

Be it known that I, SIDNEY HERBERT JOHNSON, a subject of the King of Great Britain, residing at Soho Foundry, near Birmingham, in the county of Stafford, England, have invented certain new and useful Improvements in Automatic Weighing Apparatus, of which the following is a specification.

This invention relates to improvements connected with automatic weighing apparatus, and the object of the invention is to prevent the escape of dust by trapping it, between the outlet of the supply hopper and the inlet of the weigh hopper. Various means have previously been used for accomplishing a similar object with varying success.

My invention consists in providing an extension to the supply hopper which is fastened thereto, forming a trapping or inclosing receptacle or chamber between the supply and weigh hoppers. The said extension is formed with a sleeve or funnel to pass through the inlet and into the weigh hopper, approximating closely to the formation of the said inlet, but allowing a slight clearance between the sleeve or funnel and the inlet of the weigh hopper to permit of accurate weighing. The extension is also provided with a flange against which the weigh hopper bears when empty or of less weight than the counterbalancing means, thus forming a joint between the weigh hopper and dust receptacle or chamber during such time as granular or the like material is being supplied. The flange may be provided with a packing strip of suitable material, as example, asbestos, india rubber, or the like, to minimize shock and improve the joint. When required a vent pipe may be provided for the purpose of equalizing atmospheric pressure, and as an outlet for some of the dust trapped within the receptacle or chamber.

It is found in practice when utilizing this improved type of dust cover or trap in combination with automatic weighing apparatus, that it is desirable to extend the axis or spindle of the supply gate or valve through the said extension and attach any operating mechanism or linkage exterior to the said cover to prevent the entrapped dust clogging the mechanism and checking the free operation thereof. When the material in the weigh hopper is approaching the point of balance, the weigh hopper moves out of contact with the said receptacle or chamber, thus allowing free movement of the weigh beam and its attachments, and insuring an equal accuracy in weighment as is obtainable without a dust trap.

The accompanying drawings illustrate the construction of my invention, in which—

Figure 2:
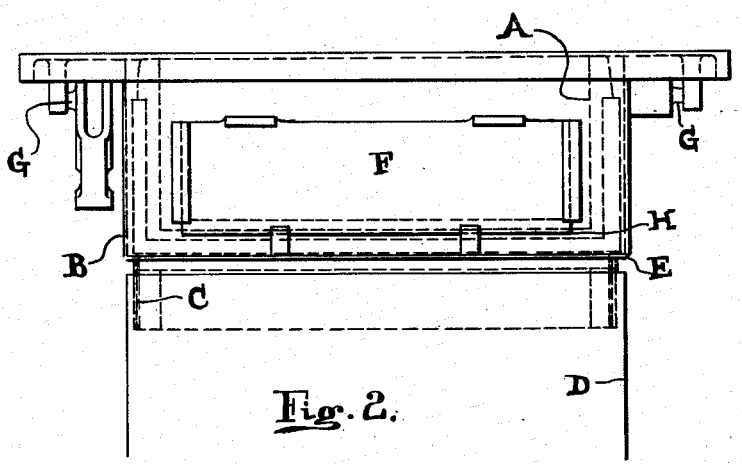

Figure 1 is a part side elevation and Fig. 2 is a part end elevation.

The supply hopper outlet $A^1$ is surrounded by an extension B forming an outer casing for the lower part A of the supply hopper and completely embracing the outlet thereof, the extension B is provided with a sleeve C which is arranged to enter the inlet of the weigh hopper D. The sleeve approximates closely in shape and size to the said inlet, but they do not contact in order not to interfere with the accuracy of weighing. Between the extension and the sleeve is a flange E against which the inlet of the weigh hopper abuts when receiving its supply of material (see the dotted line position of the weigh hopper Fig. 1). This flange may be provided with a packing or buffer strip of asbestos, india rubber, or the like to minimize shock. A vent or outlet is provided in the side of the extension, and is covered by a sliding plate F. The vent or outlet may be used to equalize atmospheric pressure, or for inspection or cleaning purposes.

It will be seen that when the weigh-hopper D is in elevated position, and in engagement with the flange E, no dust can escape, and when the weigh-hopper moves downwardly, a partial vacuum is created therein causing the entrainment of air into the weigh-hopper thereby preventing the escape of dust.

The spindle or axis G of the supply gate H is extended through the casing B and any operating mechanism or linkage is attached thereto exterior to the casing B to prevent the entrapped dust clogging the mechanism and checking the free operation of the scale.

When the material in the weigh hopper D is approaching the point of balance, the weigh hopper moves from contact with the flange E of the extension or casing B (see the full line position in Fig. 1) thus allowing free movement of the weigh beam and its attachments, and insuring as equal accuracy in weighment as can be obtained by scales not employing a dust trap.

What I claim is:—

1. In a weighing apparatus, the combination with the supply gate and weigh hopper, of a casing surrounding the supply gate, said casing, in the elevated position of the weigh hopper, extending below the mouth of the weigh-hopper a distance greater than the movement of the weigh-hopper, said extended portion of the casing conforming substantially to the contour of the mouth of the weigh-hopper and located in proximity thereto, and an abutment adapted to close the mouth of the weigh-hopper when the latter is in elevated position.

2. In a weighing apparatus, the combination with the supply gate and weigh hopper, of a casing surrounding the supply gate, said casing, in the elevated position of the weigh-hopper, extending within the mouth of the weigh-hopper a distance greater than the movement of the weigh-hopper, said extended portion of the casing conforming substantially to the contour of the mouth of the weigh-hopper and located in proximity thereto, and an abutment adapted to close the mouth of the weigh-hopper when the latter is in elevated position.

3. In a weighing apparatus, the combination with the supply gate and weigh-hopper, of a casing surrounding the supply gate, said casing, in the elevated position of the weigh hopper, extending below the mouth of the weigh-hopper a distance greater than the movement of the weigh-hopper, said extended portion of the casing conforming substantially to the contour of the mouth of the weigh-hopper and located in proximity thereto, and a flange on the casing forming an abutment adapted to close the mouth of the weigh-hopper when the latter is in elevated position.

4. In a weighing apparatus, the combination with the supply gate and weigh hopper, of a casing surrounding the supply gate and extending beyond the mouth of the weigh hopper, and with respect to which the weigh hopper is freely movable, and means for closing the opening between the casing and the sides of the weigh hopper while the material is being supplied, said casing provided with a vent and closure therefor, for the purpose described.

In testimony whereof I affix my signature in presence of two witnesses.

SIDNEY H. JOHNSON.

Witnesses:
GEORGE E. FOLKES,
ERNEST HARKER.

Copies of this patent may be obtained for five cents each, by addressing the "Commissioner of Patents, Washington, D. C."